United States Patent
Giuliani et al.

(10) Patent No.: US 7,007,912 B1
(45) Date of Patent: Mar. 7, 2006

(54) MERCHANDISE DISPLAY AND ANTI-THEFT SYSTEM

(76) Inventors: William Giuliani, 2615 Tipperary Ave., South San Francisco, CA (US) 94080; Gregory M. Defoe, 2530 Evergreen Dr., San Bruno, CA (US) 94066

( * ) Notice: Subject to any disclaimer, the term of this patent is extended or adjusted under 35 U.S.C. 154(b) by 71 days.

(21) Appl. No.: 10/853,964

(22) Filed: May 26, 2004

Related U.S. Application Data

(60) Provisional application No. 60/490,819, filed on Jul. 28, 2003.

(51) Int. Cl.
F16M 13/00 (2006.01)

(52) U.S. Cl. .......................... 248/552; 70/58
(58) Field of Classification Search ............... 248/551, 248/552, 553; 70/58, 57.1, 57, 14
See application file for complete search history.

(56) References Cited

U.S. PATENT DOCUMENTS

| | | | |
|---|---|---|---|
| 4,556,188 A * | 12/1985 | Allison, Jr. ................. | 248/553 |
| 4,696,449 A * | 9/1987 | Woo et al. .................. | 248/553 |
| 5,085,395 A * | 2/1992 | Frater et al. ................ | 248/552 |
| 5,135,197 A * | 8/1992 | Kelley et al. ............... | 248/551 |
| 5,447,044 A * | 9/1995 | Cheng ........................... | 70/58 |
| 5,836,183 A * | 11/1998 | Derman ......................... | 70/58 |
| 6,216,499 B1 * | 4/2001 | Ronberg et al. ............... | 70/58 |
| 6,257,542 B1 * | 7/2001 | Westfield et al. ........... | 248/551 |
| 6,298,695 B1 * | 10/2001 | Vezina et al. ................. | 70/58 |

\* cited by examiner

Primary Examiner—Robert P. Olszewski
Assistant Examiner—Timothy S. Smith
(74) Attorney, Agent, or Firm—Goldstein Law Office, P.C.

(57) ABSTRACT

A merchandise display and anti-theft system, for use in displaying an electronic device such as a laptop computer, comprising a base plate and a rail. The rail is mounted transversely onto a merchandise display shelf. The electronic device is selectively attached to the base plate by a crossbar. A front bracket assembly and a rear bar are provided to restrict the extent to which the electronic device may be moved in a forward or reverse direction upon the base plate. The crossbar, front bracket, and rear bar are fastened to the base plate with screws extending from beneath the base plate, in order to prevent removal of the electronic device. After mounting the rail to the shelf and affixing the base plate to the rail, the screws which hold the cross bar, rear bar, and front bracket to the base plate are inaccessible, thereby preventing theft of the electronic device selectively affixed to the base plate.

13 Claims, 6 Drawing Sheets

MERCHANDISE DISPLAY AND ANTI-THEFT SYSTEM

CROSS REFERENCES AND RELATED SUBJECT MATTER

This application relates to subject matter contained in provisional patent application Ser. No. 60/490,819, filed in the United States Patent Office on Jul. 28, 2003.

BACKGROUND OF THE INVENTION

1. Field of the Invention

The invention generally relates to a merchandise display and anti-theft system, and in particular it relates to a merchandise display and anti-theft system for use by a retail outlet in conjunction with an electronic device such as a laptop computer, for displaying the electronic device and preserving its full functionality while preventing the electronic device from being stolen.

2. Description of the Related Art

Consumers of certain electronic devices, including laptop computers, will generally want to view and "try-out" said devices in an "opened position", prior to purchasing the devices. Retail outlets generally display such devices upon shelves, often in an opened position, in order to afford consumers an opportunity to view the devices in detail and to try-out the devices. Many of these devices are quite expensive, and are attractive targets to shoplifters who might attempt to remove one of the devices from the shelve, and leave the store without paying for the device. These devices are also attractive targets for store employees, who often have greater access to merchandise then consumers, and who may attempt to remove one or more of these devices from the store upon leaving the store. Accordingly, there is a need for a merchandise display and anti-theft system, for use in conjunction with an existing support structure such as a merchandise shelf, and with an existing electronic device such as a laptop computer, for displaying the electronic device and for allowing a customer hands-on access to the device, while preventing the device from being stolen.

A variety of locking systems have been devised for displaying electronic devices, after anchoring the devices to a support structure such as a shelve. For example, U.S. Pat. No. 4,739,637 to Finkel et al appears to show a locking system comprising a cover attached to a plate, wherein after the plate has been mounted to shelving and the cover has been mounted to the electronic device, the device is rigidly attached and cannot be removed.

Additionally, U.S. Pat. No. 5,135,197 to Kelley et al appears to show a locking system comprising a base member and a cover, wherein the base member is attachable to shelving, wherein the cover is removably attached to the base member, and wherein an electronic device is secured to the cover by one or more U-shaped rod members in order to prevent theft of the electronic device.

Moreover, U.S. Pat. No. 5,836,183 to Derman appears to show a locking system comprising a base, a retaining rod fastened across the width of the base, and an upwardly protruding locking post, wherein a computer is placed with its keyboard between the base and the retaining rod, and the locking post is inserted vertically in the rear of the base, in order to prevent the computer from being pulled rearward out from under the retaining rod and removed from the device.

Furthermore, U.S. Pat. No. 6,216,499B1 to Ronberg et al appears to show a locking system comprising a retainer for engaging the computer's display, a positioning structure for moving the retainer into and out of engagement with the display, and a mounting structure for securing the system to shelving. The system further comprises a lock for fixing the position of the retainer in order to trap the computer against the shelving and thereby prevent its theft.

In addition, U.S. Pat. No. 6,308,928B1 to Galant appears to show a locking system comprising a first securing member having restraining members which define an elongated opening for selectively engaging an opened laptop computer, and a lock for selectively preventing separation of the first securing member from a desktop.

Furthermore, U.S. Pat. No. 6,443,417B2 to Galant appears to show a locking system comprising a rigid securing member having restraining members which define an elongated opening for selectively engaging an opened laptop computer, and a locking assembly rigidly and selectively attached to both the securing member and the shelving, wherein when the parts of the locking assembly are selectively moved together, the laptop computer is secured to the shelving.

While these devices may be suitable for the particular purpose employed, or for general use, they would not be as suitable for the purposes of the present invention as disclosed hereafter.

SUMMARY OF THE INVENTION

It is an object of the invention to provide a merchandise display and anti-theft system capable of preventing theft of an electronic device such as a computer while the device is being displayed in a store upon an existing shelve. Accordingly, the system comprises a rail which is rigidly attachable to an existing shelve, and a base plate which is selectively attachable to the rail. After attaching the electronic device to the base plate, the base plate is secured to the rail, thereby preventing a thief from removing the computer from the shelve.

It is another object of the invention to provide a merchandise display and anti-theft system which will not interfere with the operation of the electronic device which has been attached thereunto, and allows full demonstration thereof. Accordingly, the electronic device is selectively attached to the base plate by a tubular crossbar, which effectively prevents removal of the electronic device by a thief, while allowing a substantially unobstructed view of and hands-on access to the electronic device.

It is yet another object of the invention to provide a merchandise display and anti-theft system which may be adjusted in order to accommodate the dimensions of the particular electronic device being anchored. Accordingly, the vertical height of the crossbar is selectively adjustable in order to accommodate electronic devices having varying dimensions. Moreover, the system is provided with a rear bar and a front bracket, for engaging the rear and the front of the electronic device, respectively, in order to restrain the extent to which the electronic device may be moved rearwardly or forwardly, with respect to the base plate. The positions of the rear bar and the front bracket are adjustable, in order to accommodate electronic devices having varying dimensions.

Further objects of the invention will become apparent in the detailed description of the invention which follows.

The invention is a merchandise display and anti-theft system, for use in displaying an electronic device such as a laptop computer, comprising a base plate and a rail. The rail is mounted transversely onto a merchandise display shelf.

The electronic device is selectively attached to the base plate by a crossbar. A front bracket assembly and a rear bar are provided to restrict the extent to which the electronic device may be moved in a forward or reverse direction upon the base plate. The crossbar, front bracket, and rear bar are fastened to the base plate with screws extending from beneath the base plate, in order to prevent removal of the electronic device. After mounting the rail to the shelf and affixing the base plate to the rail, the screws which hold the cross bar, rear bar, and front bracket to the base plate are inaccessible, thereby preventing theft of the electronic device selectively affixed to the base plate.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 3:
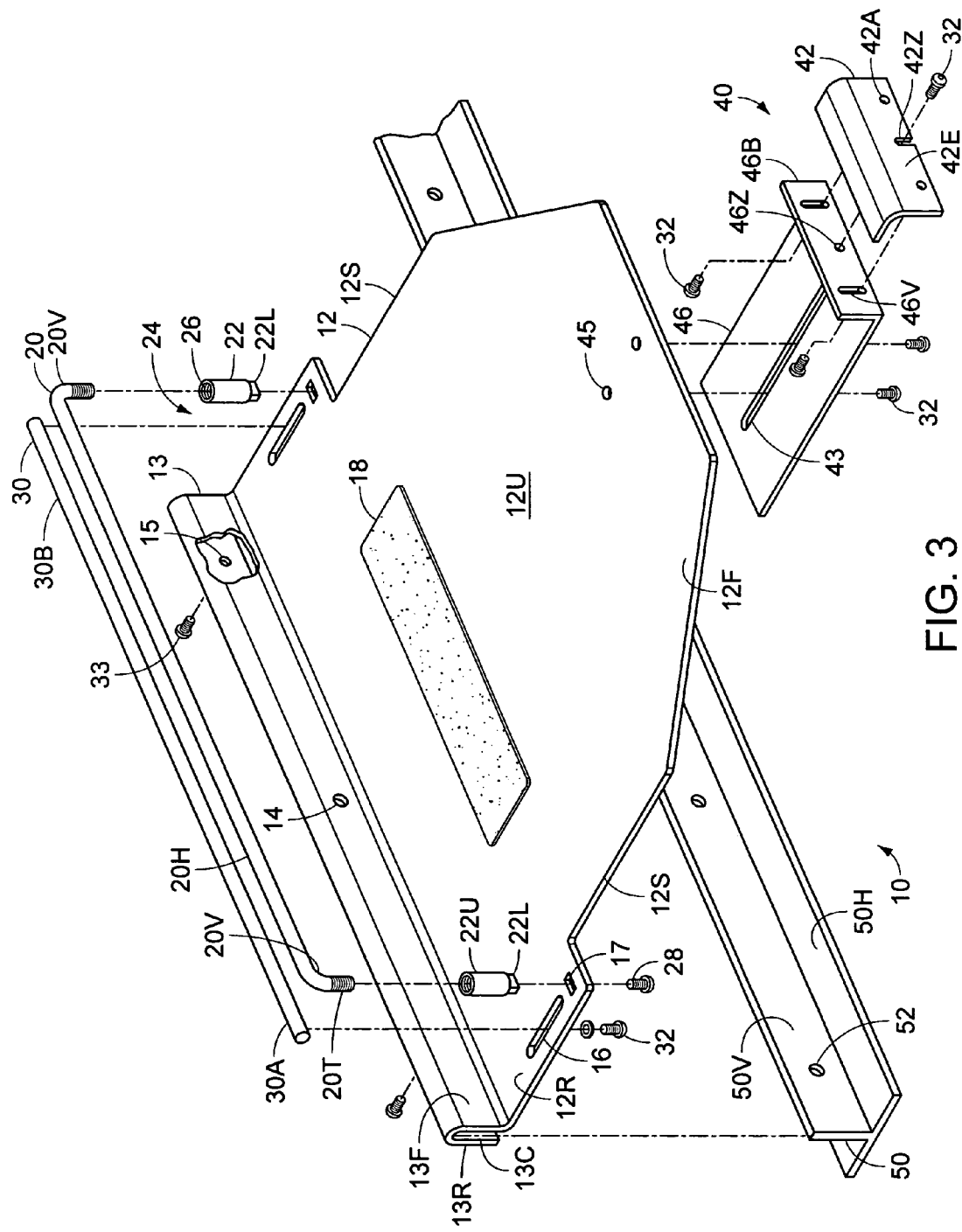
FIG. 3 is a perspective view of the merchandise display and anti-theft system, wherein the base plate is positioned for selective attachment to a rail, and wherein the rear bar, the cross bar, and the front bracket are positioned for selective attachment to the base plate.

FIG. 3 illustrates an assembly view of a merchandise display and anti-theft system 10, for use by a retail outlet in conjunction with an existing support structure such as a merchandise shelf, and with an existing electronic device such as a laptop computer, for displaying the electronic device and allowing a customer hands-on access to the device, while preventing the electronic device from being stolen. The system 10 allows a user to easily create an attractive merchandise display, and also allows subsequent repositioning and removal of any given electronic device from the display. The components of the system 10 are positioned for selective attachment to one another. Although the system 10 is capable of being used with a wide variety of electronic devices, the description will utilize the example of a laptop computer as the electronic device, for illustrative purposes.

Figure 5:
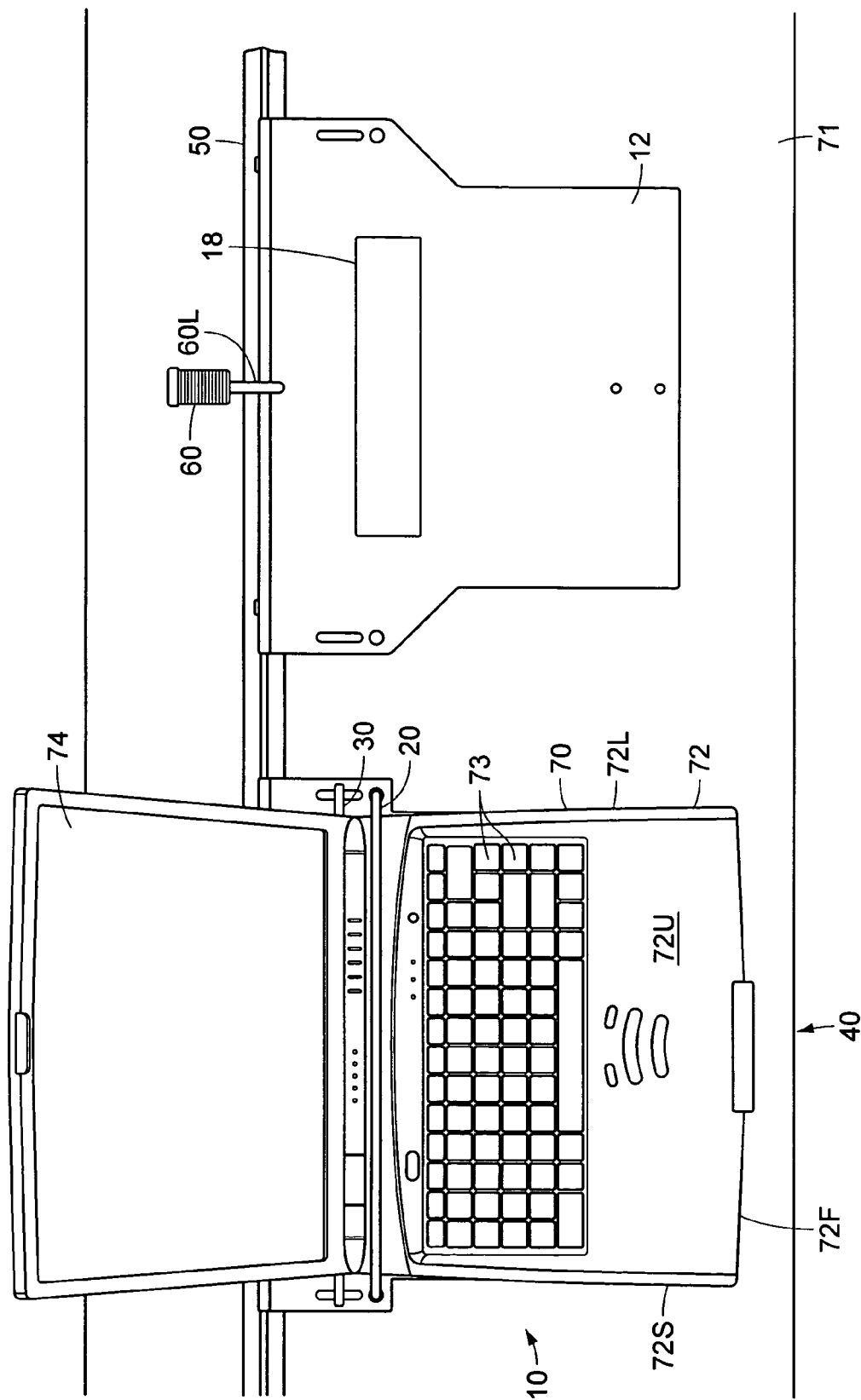
FIG. 5 is a top view of the system, wherein two base plates are attached to the rail, and wherein a laptop computer is secured to one of the base plates.

Turning momentarily to FIG. 5, a laptop computer 70, having an opened position, has been selectively immobilized upon a merchandise shelf 71 by the system 10 while in the opened position. The laptop computer 70 has a monitor 74 hingeably attached to a keyboard 72, thereby allowing the computer 70 to be converted to the opened position. The keyboard 72 has an upper surface 72U having a plurality of keys 73, a lower surface 72L, a front 72F, a rear 72R, and two lateral sides 72S.

Returning to FIG. 3, the system 10 generally comprises a base plate 12 onto which a laptop computer 70 is selectively anchored, and a rail 50 which selectively engages a portion of the base plate 12, and which is itself selectively anchored to the merchandise shelf 71. The rail 50 is preferably sized to accommodate more than one base plate 12, in order that the system 10 may be used to display more than one computer 70, as will be described. The system 10 further comprises a crossbar 20 which extends laterally across the base plate 12 in order to selectively secure the keyboard 72 of the opened computer 70 to the base plate 12, an adjustable rear bar 30 for restraining the rearward motion of the keyboard 72 on the base plate 12, and an adjustable front bracket assembly 40 for restraining the forward motion of the keyboard 72 on the base plate 12. The rear bar 30 and the front bracket assembly 40 additionally prevent a would-be thief from sliding the keyboard 72 rearward or forward underneath the crossbar 20, during an attempt to abscond with the computer 70. Returning momentarily to FIG. 5, the system 10 additionally comprises a locking device such as a padlock 60 having a loop 60L, for selectively locking the base plate 12 to the rail 50.

The substantially flat base plate 12 has a front 12F, a rear 12R, two lateral sides 12S, an upper surface 12U upon which the lower surface 72L of the keyboard 72 selectively rests, and a lower surface 12L which rests upon the merchandise shelf 71 while the system 10 is being deployed to secure the computer 70. The base plate 12 may have various shapes, but preferably has dimensions capable of supporting either the entire lower surface 72L or a substantial portion of the lower surface 72L of the keyboard 72.

Figure 6:
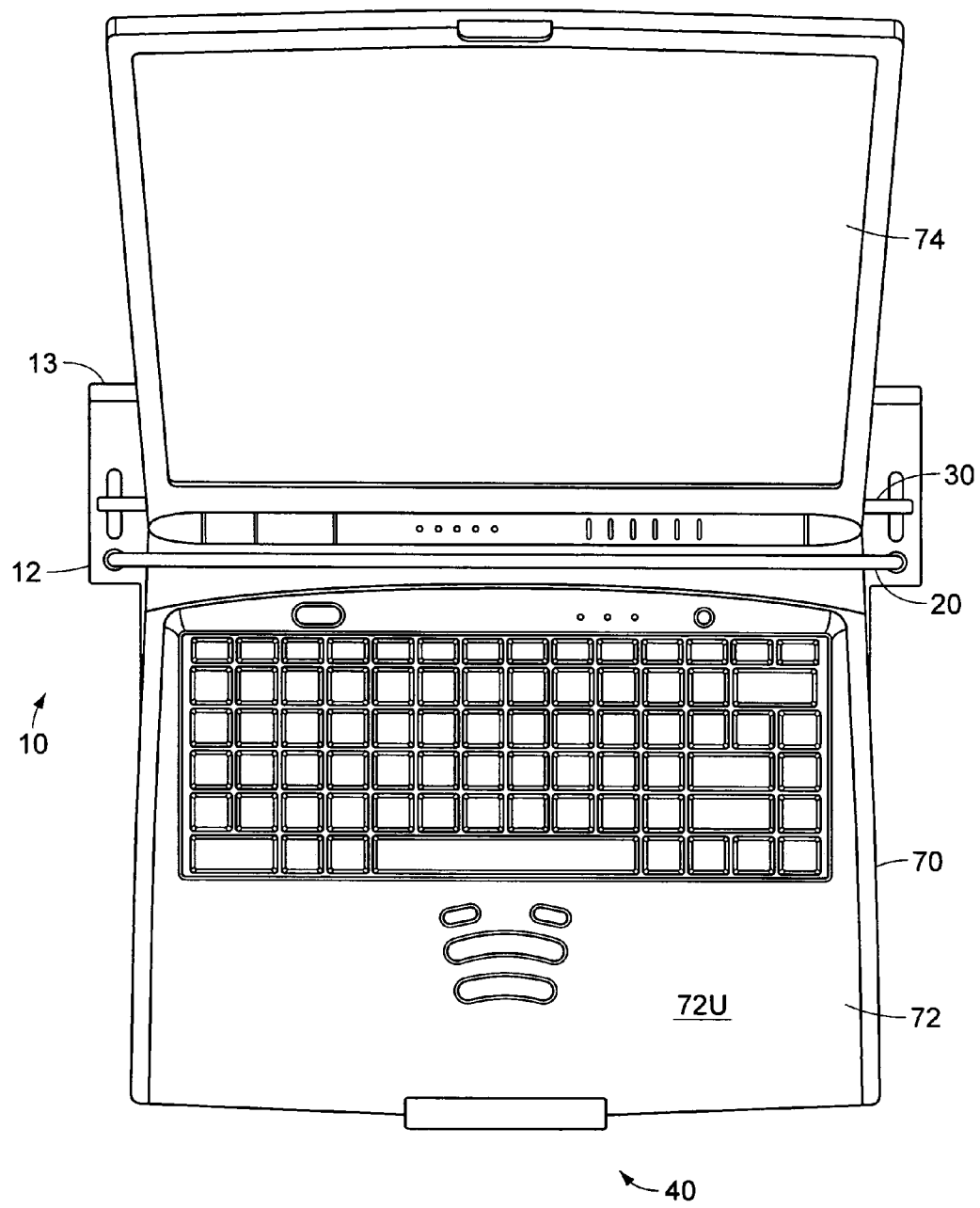
FIG. 6 is a top view of the base plate after a laptop computer has been selectively attached thereunto.

A rectangular strip 18 of fastening material is attached to the upper surface 12U of the base plate 12. A mating strip of fastening material is attached to the lower surface 72L of the keyboard 72. Together the strips of fastening material prevent the computer 70 from sliding around on the base plate 12. The fastening material may be the hook and loop fastener known by the trade name Velcro. In use, the keyboard 72 of the computer 70 is attached to the base plate 12 with the crossbar 20, and the rear bar 30 and the front bracket assembly 40 are adjusted to abut the rear 72R, and the front 72F and the upper surface 72U of the keyboard 72, respectively, prior to attaching the base plate 12 to the rail 50 which has itself been attached to the shelf 71. FIG. 6 illustrates a top view detailing the laptop computer 70 secured to the base plate 12, prior to attaching the base plate 12 to the rail 50.

The rear 12R of the base plate 12 has a U-shaped folded portion 13 extending vertically upward therefrom. The folded portion 13 defines a vertical channel 13C, a front sheet 13F, and a rear sheet 13R. The front sheet 13F and the rear sheet 13R each have a circular opening 14 extending fully therethrough, said openings 14 at substantially the same vertical height above the base plate 12.

Figure 4:
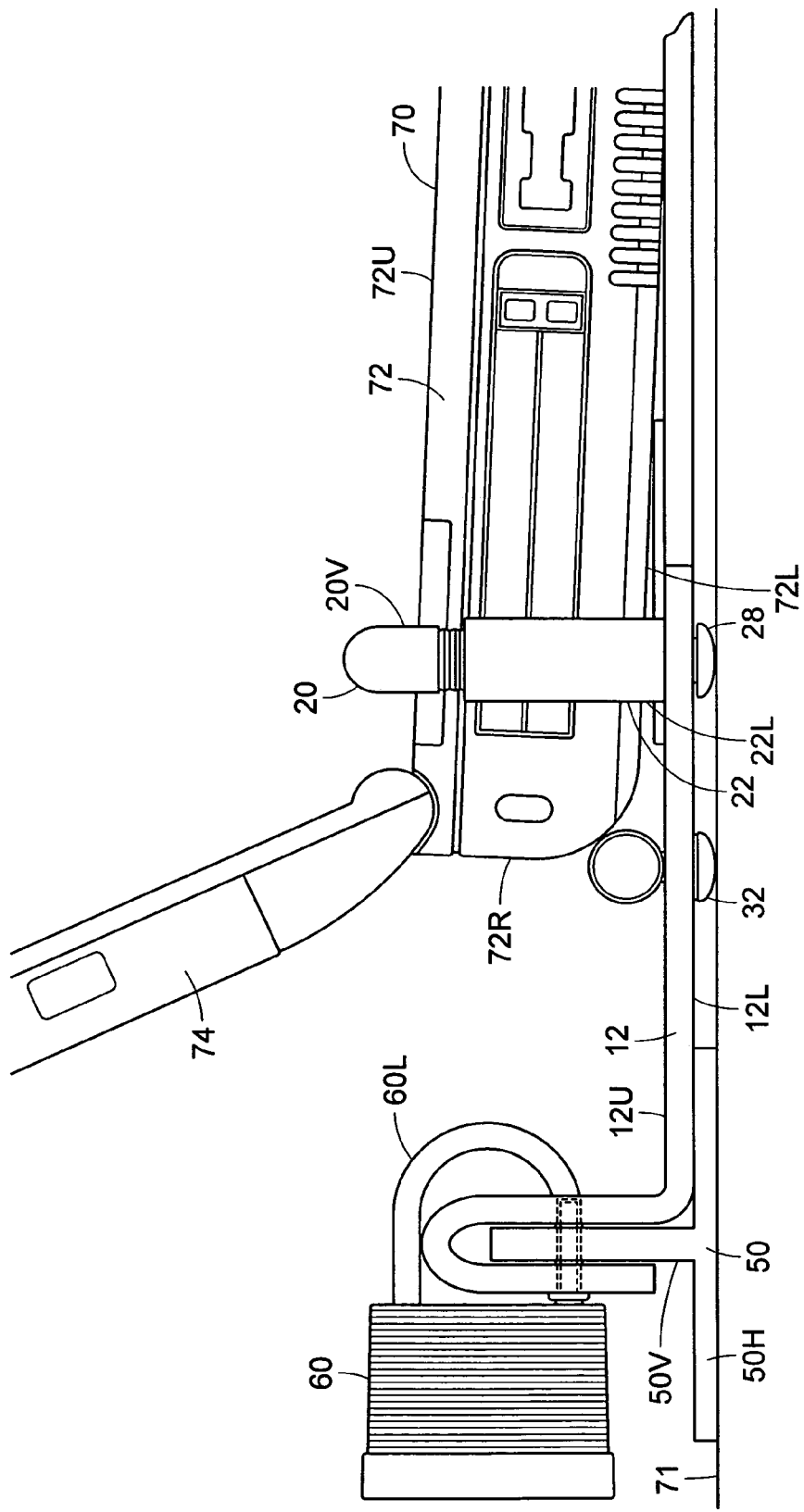
FIG. 4 is a side view of the system, after the rail has been attached to an existing shelf, wherein the base plate is locked to the rail with a padlock, and wherein a laptop computer is secured to the base plate by the cross bar and the rear bar.

The elongated T-shaped rail 50 is used to firmly anchor the base plate 12 to the shelve 71. In particular, the rail 50 has a horizontal portion 50H which is selectively attached to the shelf 71, and a vertical portion 50V extending perpendicularly upward from the horizontal portion 50V in the manner of a "T". The vertical portion 50V selectively extends into the vertical channel 13C within the folded portion 13 of the base plate 12. The vertical portion 50V has a plurality of separated circular openings 52 extending fully therethrough, each at substantially the same vertical height above the horizontal portion 50H. When the vertical portion 50V of the rail 50 is extended within the vertical channel 13C of the base plate 12, one of the circular openings 52 of the rail 50 may be aligned with the circular opening 14 extending through the front sheet 13F and the rear sheet 13R of the folded portion 13 of the base plate 12, by sliding the base plate 12 laterally. FIG. 4 illustrates a view wherein the loop 60L of the padlock 60 has been extended concentrically through each of said aligned openings 14 and 52, and the padlock 60 is locked, thereby firmly anchoring the base plate 12 to the rail 50.

The elongated rail 50 is capable of accommodating a plurality of base plates 12, in order that a plurality of computers 70 may be secured by the system 10. Accordingly, a longer rail 50 will be used for displays of greater numbers of computers 70, and a shorter rail 50 may be used for a single computer 70.

Figure 1:
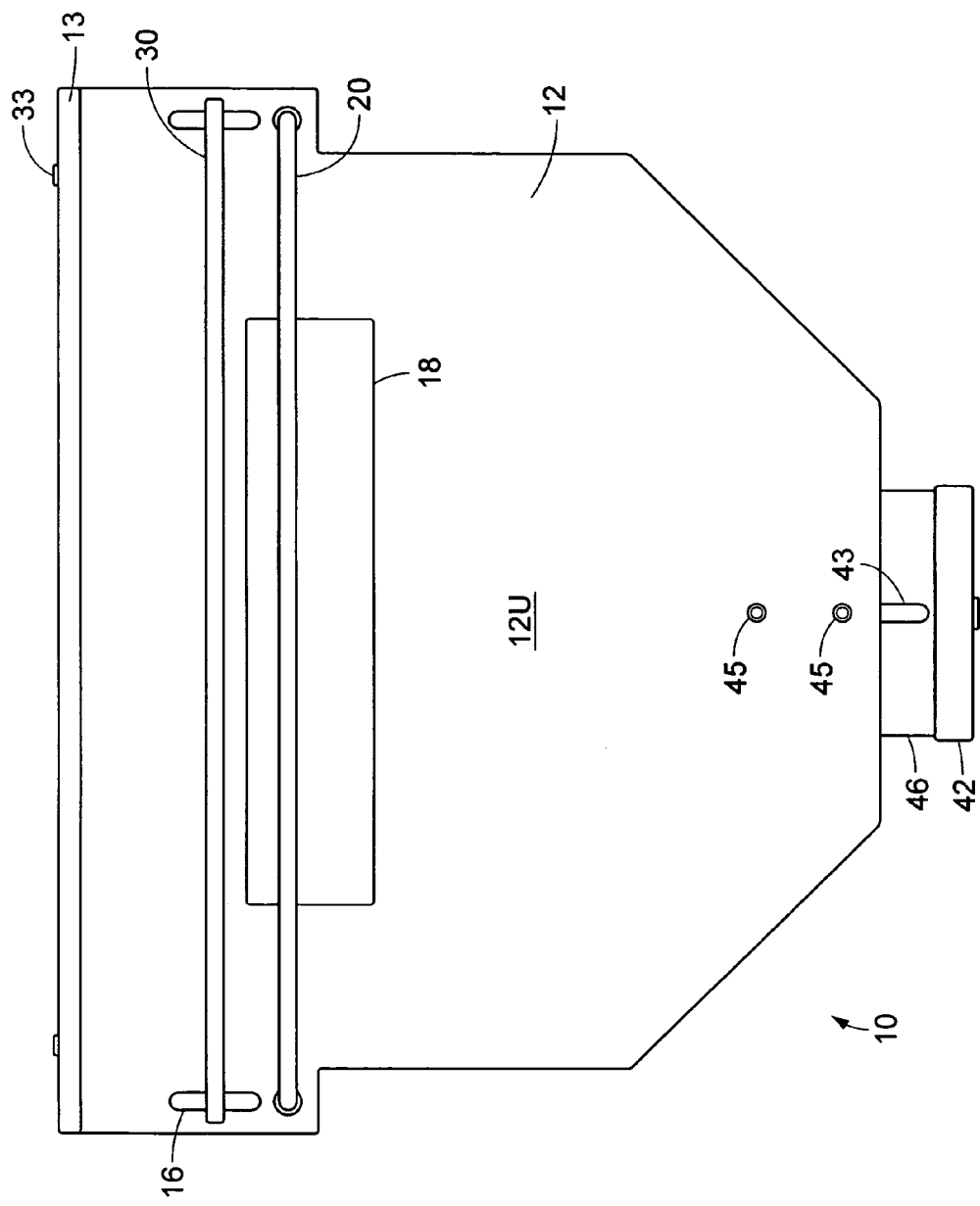
FIG. 1 is a top plan view of a merchandise display and anti-theft system, wherein a cross bar, a front bracket, and a rear bar have been attached to a base plate.
Figure 2:
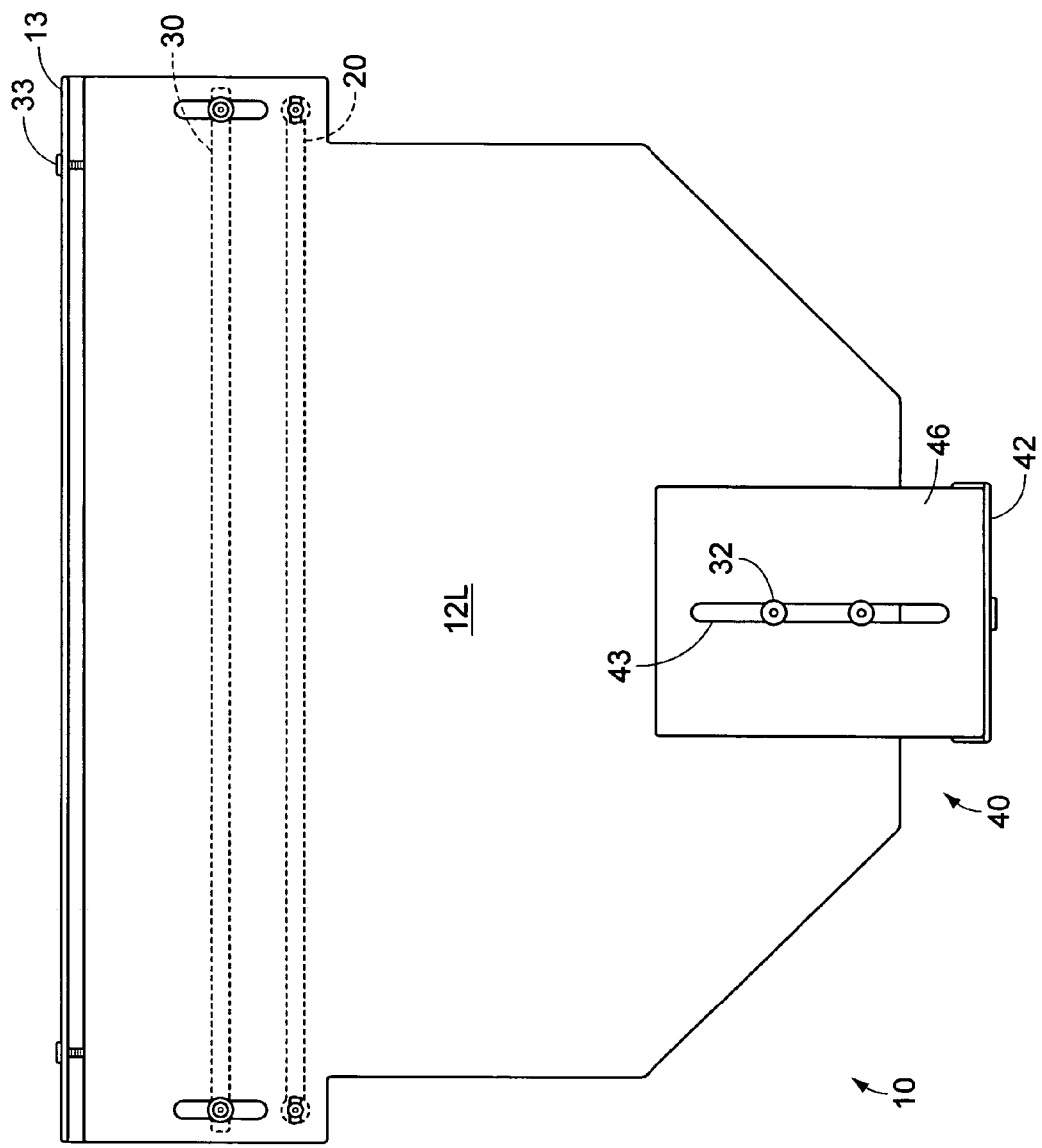
FIG. 2 is a bottom plan view of the merchandise display and anti-theft system of FIG. 1.

FIG. 1 illustrates a top plan view of the base plate 12, wherein the crossbar 20, the front bracket 40, and the rear bar 30 have been installed thereupon. FIG. 2 illustrates a bottom plan view of the base plate 12 of FIG. 1.

The substantially U-shaped crossbar 20 is used to immobilize the keyboard 72 upon the base plate 12. The crossbar 20 has two short vertical legs 20V separated by an elongated horizontal segment 20H. The vertical legs 20V have threads 20T around their periphery. The crossbar 20 is provided with two spacers 22, each having a substantially cylindrical upper portion 22U and a substantially rectangular lower portion 22L, and two associated threaded spacer screws 28. Correspondingly, the base plate 12 has two substantially rectangular spacer screw openings 17 extending fully therethrough, in proximity to the junction between the rear 12R and the lateral sides 12S of the base plate 12, through which the spacer screws 28 selectively extend. The lower portions 22L of the spacers 22, and the corresponding spacer screw openings 17 are rectangular-shaped in order to thwart attempts by a would-be thief to rotate the spacers 22 with a wrench or other tool in an attempt to detach the computer 70 from the system 10. The lower portions 22L of the spacers 22, and the corresponding spacer screw openings 17 may alternately be hexagonal-shaped. In use, the crossbar 20 is positioned adjacent to and above the hinged junction between the monitor 74 and the keyboard 72 of the opened computer 70. The upper potion 22U of each of the spacers 22 has an internal bore 24 having threads 26 which match the threads 20T of the vertical legs 20V of the crossbar 20. The lower portion 22L of each of the spacers 22 has an internal bore having threads that match the threads 20T of the spacer screws 28. The spacers 22 are used to adjust the vertical height of the horizontal segment 20H of the crossbar 20 above the base plate 12, in order to allow sufficient "clearance" to accommodate the height of the lateral sides 72S of the particular keyboard 72 which is being bracketed between the crossbar 20 and the base plate 12. In particular, after placing the keyboard 72 of the computer 70 upon the upper surface 12U of the base plate 12, one of the spacers 22 is partially threaded onto each of the vertical legs 20V of the crossbar 20 to an extent which will allow the lower portion 22L of the spacers 22 to reach the spacer screw openings 17 on the upper surface 12U of the base plate 12 after extending the crossbar 20 over the keyboard 72. The spacer screws 28 are then extended through the spacer screw openings 17, from the lower surface 12L to the upper surface 12U of the base plate 12, and threaded into the lower portion 22L of the spacer screws 28, in order to prevent the keyboard 72 from being removed from the base plate 12. The spacer screws 28 may only be accessed from the lower surface 12L of the base plate 12.

After immobilizing the keyboard 72 onto the base plate 12 with the crossbar 20, the rear bar 30 and the front bracket assembly 40 are attached to the base plate 12 using a plurality of threaded screws 32, in order to prevent the keyboard 72 from moving in a rearward or forward direction, respectively, upon the base plate 12. Additionally, bracketing of the keyboard 72 between the rear bar 30 and the front bracket assembly 40 will thwart an attempt by a would-be thief to slide the keyboard 72 rearward or forward out from underneath the horizontal segment 20H of the crossbar 20.

The elongated rear bar 30 has two ends, 30A and 30B, and a threaded opening in proximity to each end. The base plate 12 has two longitudinal slots 16 extending fully therethrough. The longitudinal slots 16 are substantially parallel to the lateral sides 12S of the base plate 12. One of the longitudinal slots is located in proximity to each of the lateral sides 12S. The rear bar 30 is mated to the base plate 12 with screws 32, which are selectively extended through the longitudinal slots 16 in the base plate 12. The screws 32 extend from the lower surface 12L of the base plate 12, through the longitudinal slots 16 in the base plate 12, and mate with the threaded openings within the rear bar 30. The slots 16 allow longitudinal travel of the rear bar 30 on the base plate 12 until the screws 32 are tightened. Returning momentarily to FIG. 4, the rear bar 30 is slid into contact with the rear 72R of the keyboard 72 and then the screws 32 are tightened. Once so tightened, a thief cannot move the keyboard 72 backwards in an attempt to remove the computer 70 from the base plate 12. The screws 32 may only be accessed from the lower surface 12L of the base plate 12.

The two-piece front bracket assembly 40 engages the front 72F of the keyboard 72. The front bracket assembly 40 includes a long plate 46, a lipped plate 42, and a plurality of threaded screws 32. The long plate 46 has one end 46B bent upwardly at a right angle. The end 46B has two vertical slots 46V and a centrally positioned threaded circular opening 46Z. The vertical slots 46V allow the user to vertically adjust the position of the lipped plate 42 prior to tightening the long plate 46 and the lipped plate 42 together. The lipped plate 42 is a substantially right-angled piece, and is used to overhang the front 72F of the keyboard 72 and extend slightly rearwardly therefrom. More particularly, the lipped plate 42 is angled at approximately one hundred degrees. The lipped plate 42 has inner surfaces, and outer surfaces 42E. The inner surfaces contact the front 72F of the keyboard 72 after the keyboard 72 has been attached to the base plate 12, and the position of the front bracket assembly 40 has been adjusted. The lipped plate 42 has two threaded screw holes 42A and a centrally located slot 42Z into which the screws 32 are selectively extended in order to fasten the long plate 46 to the lipped plate 42. The screw 32 which is extended into the slot 42Z is tightened from the outer surfaces 42E, thereby allowing the user to vertically adjust the position of the lipped plate 42 prior to tightening the long plate 46 and the lipped plate 42 together, and thereby aids in "setting up" the system 10. The screws 32 that extend into the two threaded screw holes 42A may only be accessed from the inner surface. Accordingly, after the front bracket assembly 40 is assembled with the keyboard 72 in place, the screws 32 that extend into the two threaded screw holes 42A are not accessible to a would-be thief. Although, as illustrated in FIG. 3, only one segment of the lipped plate 42 has two laterally aligned threaded screw holes 42A, it is contemplated that each of the substantially perpendicular segments of the lipped plate 42 may be provided with two laterally aligned threaded screw holes 42A. It is additionally contemplated that one of said two substantially perpendicular segments of the lipped plate 42 will be longer than the other. These two aforementioned features, in conjunction with one another, would allow the lipped plate 42 to be used to engage the upper surface 72U of computers 70 having differing heights, merely by "flipping over" the lipped plate 42 prior to selectively attaching the lipped plate 42 to the long plate 46. It is further contemplated that the lipped plate 42 may be provided with two sets of laterally aligned threaded screw holes 42A, one set vertically higher than the other. This feature would also allow the lipped plate 42 to be used to engage the upper surface 72U of computers 70 having differing heights.

The base plate 12 has two threaded circular openings 45 in proximity to the front 12F. The long plate 46 has a longitudinal slot 43 for facilitating attachment to the base plate 12, such that screws 32 extend through the longitudinal slot 43 and into the circular openings 45 to secure the long plate 46 to the base plate 12. The slot 43 allows longitudinal travel of the front bracket assembly 40 to bring the inner surfaces of the lipped plate 42 into contact with the front 72F of the keyboard 72, at which point the screws 32 are tightened to prevent the front bracket assembly 40 from sliding. The screws 32 which secure the long plate 46 to the base plate 12 may only be accessed from the lower surface 12L of the base plate 12. After installing the front bracket assembly 40 onto the base plate 12 with the computer 70 in place, the computer 70 is fully secured to the base plate 12 and cannot be removed therefrom without access to the screws 32 that hold the crossbar 20, the rear bar 30, or the front bracket assembly 40 in place. However, these screws 32 can only be accessed from underneath the base plate 12. Accordingly, once the base plate 12 is locked to the rail 50, the computer 70 cannot be removed from the shelf 71. Although, as illustrated, the base plate 12 has two threaded circular openings 45 in proximity to the front 12F, it is contemplated that the base plate 12 may be provided with several sets of two or more threaded circular openings 45, each set positioned at a different distance from the front 12F of the base plate 12. This feature would offer the user several available positions for mounting the front bracket assembly 40 to the base plate 12.

Returning to FIG. 4, after securing the computer 70 to the base plate 12 with the crossbar 20, the rear bar 30, and the front bracket assembly 40, the base plate 12 is secured to the rail 50. The horizontal portion 50H of the rail 50 has been fastened to the merchandise shelf 71. A variety of methods are available for attaching the rail 50 to the shelf 71. For example, the horizontal portion 50H of the rail 50 might be provided with a plurality of circular openings extending fully therethrough, in order that the rail 50 may be attached to the shelf 71 with threaded screws extending through the horizontal portion 50H and into the shelf 71.

The rear sheet 13R of the base plate 12 has at least one threaded circular opening 15 extending fully therethrough, and is provided with an equivalent number of threaded set screws 33. Moreover, the front sheet 13F of the base plate 12 has at least one threaded circular opening extending fully therethrough, at the same vertical height as the at least one threaded circular opening 15 extending through the rear sheet 13R of the base plate 12. The set screws are selectively threaded into the at least one opening 15 within the rear sheet 13R, extended through one of the circular openings 52 within the vertical portion 50V of the rail 50, and threaded into the at least one threaded circular opening of the front sheet 13F of the base plate, in order to firmly "lock" the base plate 12 against the rail 50 and to prevent any "free play". Obviously, the position of the circular openings 52 may be varied from that depicted in the drawing figures.

In use, a user chooses a suitable shelf 71 for a merchandise display, and attaches the rail 50 to the shelf 71. The user positions a laptop computer 70 upon the upper surface 12U of the base plate 12. The user adjusts the vertical height of the horizontal portion 20H of the crossbar 20 above the base plate 12, prior to attaching the crossbar 20 to the base plate 12, by threading one of the spacers 22 onto each of the vertical legs 20V of the crossbar 20 to an extent which will allow the lower portion 22L of the spacers 22 to reach the spacer screw openings 17 on the upper surface 12U of the base plate 12 after extending the crossbar 20 over the keyboard 72. The user attaches the crossbar 20 to the base plate 12 by extending the spacer screws 28 through the spacer screw openings 17, from the lower surface 12L to the upper surface 12U of the base plate 12, and threading the screws 28 into the lower portion 22L of the spacers 22, in order to prevent the computer 70 from being removed from the base plate 12. The user mates the rear bar 30 to the base plate 12 by extending a screw 32 through each of the longitudinal slots 16 within the base plate 12, from the lower surface 12L of the base plate 12, and by mating each of the screws 32 with one of the threaded openings within the rear bar 30. The user adjusts the position of the rear bar 30 by sliding the rear bar within the longitudinal slot 16 until the rear bar 30 abuts the rear 72R of the keyboard 72, and then tightens the screws 32 in order to maintain the rear bar 30 at this position. The user vertically adjusts the position of the lipped plate 42 upon the long plate 46 prior to tightening the long plate 46 to the lipped plate 42, by extending the screws 32 through the vertical slots 46V of the long plate 46 and into the threaded screw holes 42A within the lipped plate 42. The user positions the long plate 46 underneath the base plate 12 and slides the front bracket assembly 40 rearward to bring the inner surfaces of the lipped plate 42 into contact with the front 72F of the keyboard 72. The user extends the screws 32 through the longitudinal slot 43, and into the threaded circular openings 45 within the base plate 12, in order to maintain the front bracket assembly 40 at this position. The user extends the vertical portion 50V of the rail 50 into the vertical channel 13C of the folded portion 13 of the base plate 12. The user locks the base plate 12 to the rail 50 by extending the loop 60L of the opened padlock 60 through the aligned openings, 14 and 52, of the base plate 12 and the rail 50, respectively. After attaching the computer 70 to the base plate 12, and locking the base plate 12 to the rail 50, the screws 32 that hold the crossbar 20, the rear bar 30, and the front bracket assembly 40 in place are inaccessible to a would-be thief, making it impossible for the thief to remove the computer 70 from the base plate 12. Moreover, at least some of the screws that mount the rail 50 to the merchandise shelf 71 are covered by the attached base plate 12.

In conclusion, herein is presented a system for locking an electronic device such as a laptop computer to a merchandise display shelf, so that the electronic device can be safely displayed while preserving full functionality thereof. The invention may be embodied in the form shows in the accompanying illustrations. Numerous variations thereof, however, are possible. Such variations are contemplated as being a part of the present invention.

What is claimed is:

1. A merchandise display and anti-theft system, for use in conjunction with an existing support structure such as a merchandise shelf, and with an existing laptop computer, for displaying the computer and allowing a customer hands-on access to the computer, while preventing the computer from being stolen by a thief, wherein the computer has a monitor hingeably attached to a keyboard, said keyboard having an upper surface, a lower surface, a front, a rear, and two lateral sides, comprising:

a base plate onto which the computer is selectively anchored, having a front, a rear, two lateral sides, an upper surface upon which the lower surface of the keyboard selectively rests, and a lower surface which rests upon the merchandise shelf while the system is being deployed;

a rail which selectively attaches to a portion of the base plate, and which is itself selectively anchored to the merchandise shelf;

a locking device for selectively locking the base plate to the rail;

a crossbar which selectively extends laterally across the base plate and attaches to the base plate, in order to selectively secure the keyboard to the base plate;

an adjustable rear bar which is selectively attachable to the base plate, for restraining the rearward motion of the keyboard upon the base plate and for preventing a would-be thief from sliding the keyboard rearward underneath the crossbar during an attempt to abscond with the computer;

an adjustable front bracket assembly which is selectively attachable to the base plate, for engaging the front of the keyboard in order to restrain the forward motion of the keyboard on the base plate and for preventing the would-be thief from sliding the keyboard forward underneath the crossbar during an attempt to abscond with the computer; and wherein the keyboard of the computer is attached to the base plate, and the rear bar and the front bracket assembly are adjusted, prior to attaching the base plate to the rail which has itself been attached to the shelf.

2. The merchandise display and anti-theft system as recited in claim 1, wherein the rail is sized to accommodate more than one base plate in order that the system may be used to immobilize and display more than one computer.

3. The merchandise display and anti-theft system as recited in claim 2, wherein the locking device is a padlock.

4. The merchandise display and anti-theft system as recited in claim 3, wherein the rear of the base plate has a U-shaped folded portion extending vertically upward therefrom, said folded portion defining a vertical channel, a front sheet, and a rear sheet, wherein the front sheet and the rear sheet each have a circular opening extending fully therethrough at substantially the same vertical height above the base plate, wherein the rail has a horizontal portion, and a vertical portion extending perpendicularly from the horizontal portion, wherein the vertical portion selectively extends into the vertical channel within the folded portion of the base plate, said vertical portion having at least one circular opening extending fully therethrough, wherein when the vertical portion of the rail is extended within the vertical channel of the base plate, each of the at least one of the circular openings of the rail may be aligned with the circular opening extending through the front sheet and the rear sheet of the folded portion of the base plate, in order to permit the loop of the opened padlock to be extended concentrically through each of said aligned openings, prior to locking the padlock, and thereby firmly anchoring the base plate to the rail.

5. The merchandise display and anti-theft system as recited in claim 4, wherein the rear sheet of the base plate has at least one threaded circular opening extending fully therethrough, and is provided with an equivalent number of threaded set screws, wherein the front sheet of the base plate has at least one threaded circular opening extending therethrough, at the same vertical height as the at least one threaded circular opening extending through the rear sheet of the base plate, wherein the vertical portion of the rail is provided with an equivalent number of circular openings extending fully therethrough, also at the same vertical height as the at least one threaded circular opening extending through the rear sheet of the base plate, and wherein the set screws are selectively threaded into the at least one opening within the rear sheet, extended through the at least one circular openings within the vertical portion of the rail, and threaded into the at least one threaded circular opening of the front sheet of the base plate, in order to immobilize the base plate against the rail.

6. The merchandise display and anti-theft system as recited in claim 5, wherein the crossbar has two short vertical legs separated by an elongated horizontal segment, wherein the vertical legs have threads around their periphery, wherein the crossbar is provided with two spacers having an upper portion and a lower portion, and two associated threaded spacer screws, and wherein correspondingly, the base plate has two spacer screw openings extending fully therethrough, in proximity to the junction between the rear and the lateral sides of the base plate, through which the spacer screws selectively extend, wherein the upper portion of each of the spacers has an internal bore having threads which match the threads of the vertical legs of the crossbar, and wherein the lower portion of each of the spacers has an internal bore having threads that match the threads of the spacer screws, said spacers for adjusting the vertical height of the horizontal segment of the crossbar above the base plate, in order to allow sufficient clearance to accommodate the height of the lateral sides of the particular keyboard which is being bracketed, wherein the spacer screws extend through the spacer screw openings, from the lower surface to the upper surface of the base plate, and are threaded into the lower portion of the spacers, in order to prevent the keyboard from being removed from the base plate, and wherein the spacer screws may only be accessed from the lower surface of the base plate after the base plate has been attached to the rail, thereby making it difficult for the thief to steal the computer.

7. The merchandise display and anti-theft system as recited in claim 6, wherein the upper portion of each of the spacers is substantially cylindrical, wherein the lower portion of each of the spacers is substantially rectangular, and wherein, correspondingly, the spacer screw openings extending fully through the base plate are substantially rectangular, in order to thwart attempts by a thief to rotate the spacers in an attempt to detach the computer from the system.

8. The merchandise display and anti-theft system as recited in claim 7, wherein the elongated rear bar has two ends, and a threaded opening in proximity to each end, and wherein correspondingly, the base plate has two longitudinal slots extending fully therethrough, wherein the rear bar is mated to the base plate with threaded screws which are selectively extended from the lower surface of the base plate and through the longitudinal slots in the base plate, and mated with the threaded openings within the rear bar, said slots for allowing the rear bar to be slid into contact with the rear of the keyboard prior to tightening the screws, and wherein the screws may only be accessed from the lower surface of the base plate, thereby making it difficult for the thief to steal the computer.

9. The merchandise display and anti-theft system as recited in claim 8, wherein the front bracket assembly includes a long plate, a lipped plate, and a plurality of threaded screws, wherein the long plate has one end bent upwardly at a right angle having vertical slots which allows vertical adjustment of the lipped plate prior to tightening the long plate and the lipped plate together, wherein the lipped plate is used to overhang the front of the keyboard and extend slightly rearwardly therefrom, wherein the lipped plate has inner surfaces which contact the front of the keyboard after the keyboard has been attached to the base plate and the position of the front bracket assembly has been adjusted, wherein the lipped plate has threaded screw holes into which the screws are selectively extended in order to fasten the long plate to the lipped plate, wherein these screws may only be accessed from the inner surface, thereby making it difficult for the thief to steal the computer after the front bracket assembly is assembled with the keyboard in place.

10. The merchandise display and anti-theft system as recited in claim 9, wherein the base plate has at least one threaded circular opening in proximity to the front, and wherein the long plate has a longitudinal slot for facilitating attachment to the base plate, such that a screw extends through each of the at least one circular openings to secure the long plate to the base plate, said slot for allowing longitudinal travel of the front bracket assembly to bring the inner surfaces of the lipped plate into contact with the front of the keyboard prior to tightening the screws, wherein the screws which secure the long plate to the base plate may only be accessed from the lower surface of the base plate, thereby making it difficult for the thief to steal the computer.

11. The merchandise display and anti-theft system as recited in claim 10, further comprising a strip of fastening material attached to the upper surface of the base plate, and a mating strip of fastening material which is selectively attached to the lower surface of the keyboard, wherein together, the strips of fastening material prevent the computer from sliding around on the base plate.

12. The merchandise display and anti-theft system as recited in claim 11, wherein the fastening material is the hook and loop fastener known by the trade name Velcro.

13. The merchandise display and anti-theft system as recited in claim 12, wherein the horizontal portion of the rail is attachable to the merchandise shelf.

* * * * *